US009846568B2

(12) United States Patent
Hamilton et al.

(10) Patent No.: US 9,846,568 B2
(45) Date of Patent: Dec. 19, 2017

(54) SYSTEM AND METHOD FOR DYNAMIC TUNING FEEDBACK CONTROL FOR RANDOM NUMBER GENERATOR

(71) Applicant: Synopsys, Inc., Mountain View, CA (US)

(72) Inventors: Neil Farquhar Hamilton, Kanata (CA); Scott Andrew Hamilton, Toronto (CA); Michael Borza, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 628 days.

(21) Appl. No.: 14/275,924

(22) Filed: May 13, 2014

(65) Prior Publication Data

US 2014/0351305 A1 Nov. 27, 2014

Related U.S. Application Data

(60) Provisional application No. 61/826,883, filed on May 23, 2013.

(51) Int. Cl.
*G06F 7/58* (2006.01)

(52) U.S. Cl.
CPC .................. *G06F 7/588* (2013.01)

(58) Field of Classification Search
CPC ............................. G06F 7/58–7/588
USPC .................................. 708/250–256
See application file for complete search history.

(56) References Cited

U.S. PATENT DOCUMENTS

| 6,480,072 | B1 | 11/2002 | Walsh et al. |
| 6,509,772 | B1 * | 1/2003 | Ye ..................... H03K 3/356156 327/211 |
| 6,862,605 | B2 * | 3/2005 | Wilber .................... G06F 7/588 708/251 |
| 7,424,500 | B2 | 9/2008 | Fukushima et al. |
| 7,436,211 | B2 * | 10/2008 | Ueda .............. G01R 31/318541 326/16 |
| 8,024,386 | B2 | 9/2011 | Song et al. |
| 2009/0110188 | A1 * | 4/2009 | Dolgunov ................. G06F 7/58 380/28 |
| 2010/0106757 | A1 * | 4/2010 | Matthews, Jr. ........... G06F 7/58 708/251 |
| 2010/0153478 | A1 | 6/2010 | Aliseychik et al. |
| 2011/0169580 | A1 * | 7/2011 | Dodrill .................. H03B 29/00 331/56 |

(Continued)

OTHER PUBLICATIONS

Jun et al., "The Intel Random Number Generator," Crytography Research, Inc. White Paper, 1999.*

(Continued)

*Primary Examiner* — Matthew Sandifer
(74) *Attorney, Agent, or Firm* — Jaquez Land Greenhaus LLP; Bruce W. Greenhaus, Esq.

(57) ABSTRACT

A random number generator includes a first circuit producing a random sequence of values, the first circuit having an adjustable input that changes the entropy of the random sequence of numbers; a second circuit receiving the random sequence of values from the first circuit and producing an output indicative of the degree of entropy of the random sequence of values, and a third circuit that adjusts the adjustable input of the first circuit in response to the output of the second circuit.

7 Claims, 7 Drawing Sheets

(56) References Cited

U.S. PATENT DOCUMENTS

2013/0013657 A1* 1/2013 Emelko .............. G06F 7/588
　　　　　　　　　　　　　　　　　　　　　　708/251
2014/0280413 A1* 9/2014 Lewis ................. G06F 7/588
　　　　　　　　　　　　　　　　　　　　　　708/251

OTHER PUBLICATIONS

T. Nakura, M. Ikeda, K. Asada, "Ring oscillator based random number generator utilizing wake-up time uncertainty", Proc. IEEE Asian Solid-State Circuits Conf., pp. 113-116, 2009.*
International Search Report in related Application No. PCT/IB2014/061439, dated Sep. 4, 2014 (3 pages).
Written Opinion in related Application No. PCT/IB2014/061439, dated Sep. 4, 2014 (6 pages).
Jun, et al., "The Intel Random Number Generator", Cryptography Research, Inc. White Paper prepared for Intel Corporation, Apr. 22, 2999, pp. 1-8.
Chinese Patent Office, Office Action received from the Chinese Patent Office dated May 16, 2017 for appln. No. 201480029801.9, 21 pgs.

* cited by examiner

SYSTEM AND METHOD FOR DYNAMIC TUNING FEEDBACK CONTROL FOR RANDOM NUMBER GENERATOR

CROSS-REFERENCE TO RELATED APPLICATIONS

This application claims the benefit of and priority to U.S. Provisional Patent Application No. 61/826,883, filed on May 23, 2013, which is incorporated herein by reference in its respective entirety.

FIELD OF THE INVENTION

The invention generally relates to digital security and more particularly to generation of values within a random sequence of values for use in digital security processes within electronic systems.

BACKGROUND

Random number generators used in cryptographic systems generally fall into one of two categories. Pseudo random number generators (PRNGs), also referred to as deterministic random number or bit generators (DRNGs or DRBGs), use a mathematical function to generate a value within a sequence of values that has random distribution characteristics. Good PRNGs are often based on a cryptographic function, have a very long sequence that either never repeats or does not repeat frequently, and are difficult to follow—the progression appears non-predictable. They are relied upon because (1) their output values have known statistical characteristics, and (2) the PRNG is invoke-able, and can be invoked as frequently as necessary to produce random numbers on demand by a user. One of the biggest problems with PRNGs is that if one knows the starting value used to initialize the PRNG, usually called a "seed," one can reliably determine the entire sequence of values generated by the PRNG.

A second category of random number generators is called "true" random number generators (TRNGs). These are also referred to as non-deterministic random number or bit generators (NRNGs or NRBGs). TRNGs use a value or set of values sampled from a random physical process to create their output sequence of values. Examples of random physical processes include thermal noise generated in a resistor, shot noise in a transistor, the time between spontaneous energy emissions from a body undergoing radioactive decay, and the number of atoms of matter in a given volume of interplanetary space at any given time. Some random processes are more suitable than others for implementation in different electronic communications systems.

It is common to combine a TRNG with a PRNG, either in a single module or as a cascade in which the TRNG output sequence of values is used to seed the PRNG. This arrangement often provides a very high quality source of random numbers that have the unbiased, white spectrum statistical characteristics of a PRNG and the unpredictability of a TRNG. In addition to its other qualities, a PRNG typically produces random numbers at a faster rate than a TRNG. Security is maintained by periodically reseeding the PRNG with the TRNG sufficiently often to limit a statistical likelihood of security breaches.

SUMMARY OF THE INVENTION

In accordance with one embodiment, a random number generator comprises a first circuit producing a random sequence of values, the first circuit having an adjustable input that changes the entropy of the random sequence of numbers; a second circuit receiving the random sequence of values from the first circuit and producing an output indicative of the degree of entropy of the random sequence of values; and a third circuit that adjusts the adjustable input of the first circuit in response to the output of the second circuit.

In one implementation, the first circuit includes a pair of oscillators producing first and second oscillating output signals, at least the second oscillator being tunable so that the frequency of the second oscillating output signal can be adjusted, and a sampling circuit receiving the first and second oscillating output signals and sampling the first oscillating output signal at intervals determined by the second oscillating output signal. The first and second oscillators are preferably free-running from the first application of power, so that said first and second oscillating output signals have random phases with respect to each other. The second circuit is a von Neumann de-correlator that produces a first output signal that changes states whenever the output of said first circuit is in first and second states for equal portions of a selected time period. A counter counts the state changes in the first output signal of the de-correlator, and is reset each time the count reaches a predetermined threshold value. The third circuit adjusts the adjustable input of the first circuit each time the count reaches the predetermined threshold value.

In accordance with embodiments of the invention, there is provided a circuit for producing a random sequence of values comprising: a digital circuit designed to produce a result based on inherent entropy therein, in at least a state thereof, the results other than deterministic; a tuning circuit for tuning an entropy proportion of the results of the digital circuit; and an output port for providing therefrom the results as a random sequence of values.

In accordance with embodiments of the invention, there is provided a method that comprises providing a first digital oscillator starting from a first known state; providing a second other digital oscillator starting from a second other known state; tuning at least one of the first digital oscillator and the second other digital oscillator to result in an interaction between the first digital oscillator and the second digital oscillator depends upon an entropy of at least one of the first digital oscillator and the second other digital oscillator; sampling of at least one of the first digital oscillator and the second other digital oscillator such that a value is determined in dependence upon both the first digital oscillator and the second other digital oscillator and an entropy therein.

In accordance with embodiments of the invention there is provided a circuit comprising: a first circuit portion having entropy therein for affecting a result thereof to from a sequence of non-deterministic values; and an automated control system for adjusting an amount of entropy within the sequence of non-deterministic values.

In accordance with embodiments of the invention, there is provided a storage medium having data stored therein for when implemented resulting in: a circuit for being manufactured in accordance with any one of a plurality of different semiconductor manufacturing processes and comprising: a digital circuit designed to produce a result based on inherent entropy therein, in at least a state thereof, the results other than deterministic; a tuning circuit for tuning an entropy proportion of the digital circuit, the tuning source; and an output port for providing therefrom a random sequence of values.

In accordance with embodiments of the invention there is provided a method comprising: providing a first random number generator for providing a non-deterministic sequence of values by: forming a first digital circuit designed to produce a non-deterministic result based on inherent entropy, in at least one state; forming a tuning circuit for tuning an entropy proportion of the first digital circuit; and forming an output port for providing therefrom a random sequence of values; and providing a second random number generator for providing a non-deterministic sequence of values by: forming a second digital circuit designed to produce a non-deterministic result based on inherent entropy, in at least one state thereof; forming a tuning circuit for tuning an entropy proportion of the second digital circuit; and forming an output port for providing therefrom a random sequence of values. The first and second digital circuits may be formed using different digital integrated circuit technologies, and the integrated circuit design files for the first and second random number generators and the second random number generators may be the same integrated circuit design files.

Figure 1:
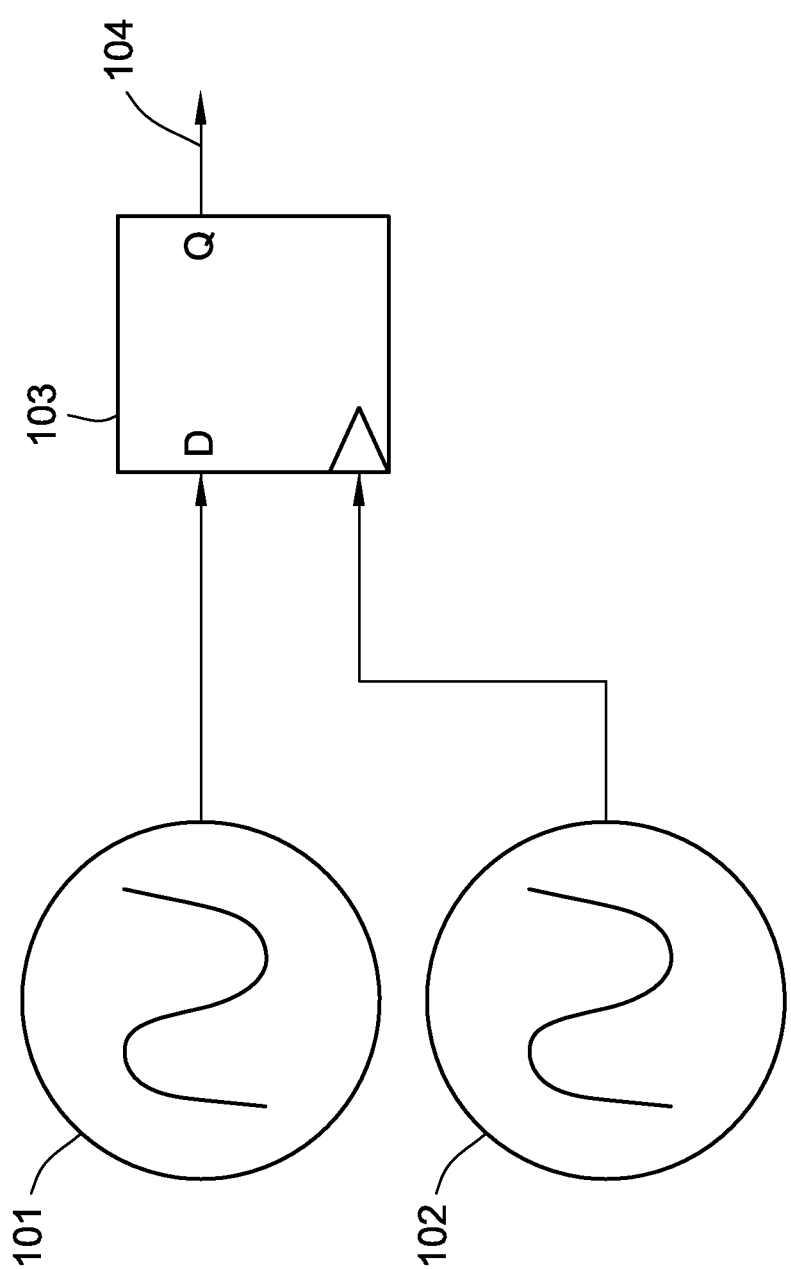
FIG. 1 is a schematic diagram of a circuit that includes a pair of free-running oscillators, one of which controls the sampling of the output of the other by a D-type flip flop.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

In the circuit shown in FIG. 1, a circuit containing two free running oscillators 101 and 102 is used to generate a sequence of samples containing random data. One oscillator 102 acts as the sampling clock, and the other oscillator 101 produces the signal to be sampled. The oscillators 101 and 102 need not be very high quality by conventional measures of merit for oscillators (e.g., low jitter, stability over time, etc.). In fact, the rate of entropy production, i.e., the randomness or unpredictability of the values of the samples in the generated data stream, is enhanced by using poor quality oscillators. It is usual for the oscillators to be chosen such that their spectral characteristics are not harmonically related. One strategy for choosing the oscillators is to choose a slow sampling oscillator relative to the sampled oscillator's fundamental mode, i.e., it is sampled at a frequency well below the sampled oscillator's Nyquist rate.

Entropy may be maximized by allowing the oscillators to free-run from the first application of power. This ensures that the oscillators have random phase with respect to each other. The first oscillator 101 oscillates at a known frequency and comprises a known amount of entropy in transitions thereof. The second tunable oscillator 102 comprises a second known amount of entropy in transitions thereof. For digital circuits, ring oscillators composed of closed rings of an odd number of logic inverters may be used. When allowed to free-run from power-up, these oscillators may actually operate on a non-fundamental mode, which further increases entropy. Over time, oscillators may change modes. Composing each ring, or parts of each ring, from different library cells helps ensure that the oscillators' fundamental modes are not harmonically related. Primary factors that contribute to the entropy measured by the system include: random phase and initial states of oscillators; oscillator jitter; non-stationary operating point of the oscillators; and occasional sampling of an oscillator within a metastable window.

The system of FIG. 1 may be generalized to include more oscillators, each operating at its own frequency. While sampling may be done using a single sampling oscillator, there are advantages to operating in pairs. Chief among these are fault and failure tolerance due to redundancy. Output bits from each oscillator pair subsystem are collected at a sampling circuit such as a D flip-flop 103 for each oscillator pair, to produce a random sequence of values on a single output line 104. Changing the sampling frequency changes the entropy of the random sequence of values.

While the system of FIG. 1 can produce a high quality random bit stream, it suffers from a number of disadvantages. First, well-designed digital systems generally do not allow subsystems to start in unpredictable states, and generally do not allow sub-systems to free-run from those states. There are many undesirable results from this kind of circuit operation. Power utilization is unpredictable, which is problematic in battery-powered digital circuits. System quiescent supply current has a large random noise component, and in some cases noise emanation in the radio frequency spectrum may adversely affect compatibility with other nearby RF components and subsystems. To retain maximum entropy, oscillators must be allowed to continue running throughout each power-up cycle. This wastes power, particularly when some oscillators are running on non-fundamental modes. Further, once started, each oscillator is continuous while the circuit is powered such that power management of the oscillator circuit is not a straight forward process of reducing power consumption when not in use and re-engaging the circuit when needed. As a result, it is desirable to operate the system in a mode in which it may be switched on and off when desired, and in a mode in which it is possible to guarantee the operating frequency of the oscillators.

Figure 2:
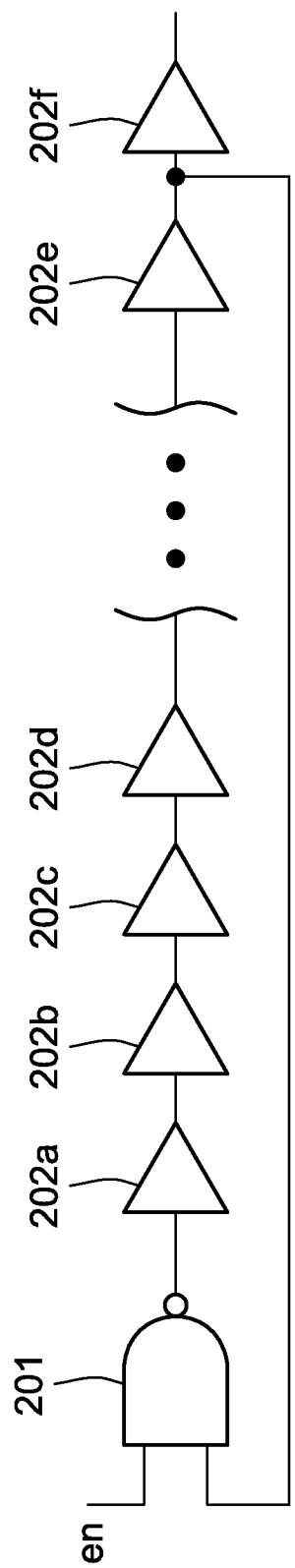
FIG. 2 shows an oscillator with simple gate control to enable/disable the oscillator on demand.

FIG. 2 shows an oscillator circuit which includes a control gate 201 and multiple buffers 202a-f. Using a simple control strategy such as shown in FIG. 2 for enabling and disabling the oscillators, such as a control gate, shown here as a NAND gate 201, in the oscillator paths, results in predictable alignment of the oscillators' operations. It also ensures that the oscillators operate on their fundamental modes, and hence at minimum power consumption. While this mode of operation is desirable from many points of view, the gating of the oscillators results in the loss of any initial entropy in the oscillator ring and causes the oscillator to operate on its fundamental mode, in addition to the synchronization of its start-up with that of adjacent oscillators.

Oscillators retain other sources of uncertainty such as susceptibility to noise from nearby circuitry and power supplies, as well as jitter inherent in oscillator operation. Designing circuitry to encourage races between oscillators, in which the sampling gate is triggered when its input port is in the metastable transition region, is one method of increasing the rate at which entropy is harvested from an entropy source. Using complementary transparent latches in place of a monolithic library flip-flop allows the sampling circuit to exhibit enhanced metastable vulnerability, which is a further source of entropy. In one method to create a digital output sequence, a frequency or event counter is used to measure a number of events observed in a given time window. Successive pairs of counter output values are compared to produce a bit of output data. The comparison produces, for example, a logical true output value when the x sample is larger than the y sample; a logical false output value when the x sample is smaller than the y sample; and discards the output values when the samples have the same value.

Figure 3:
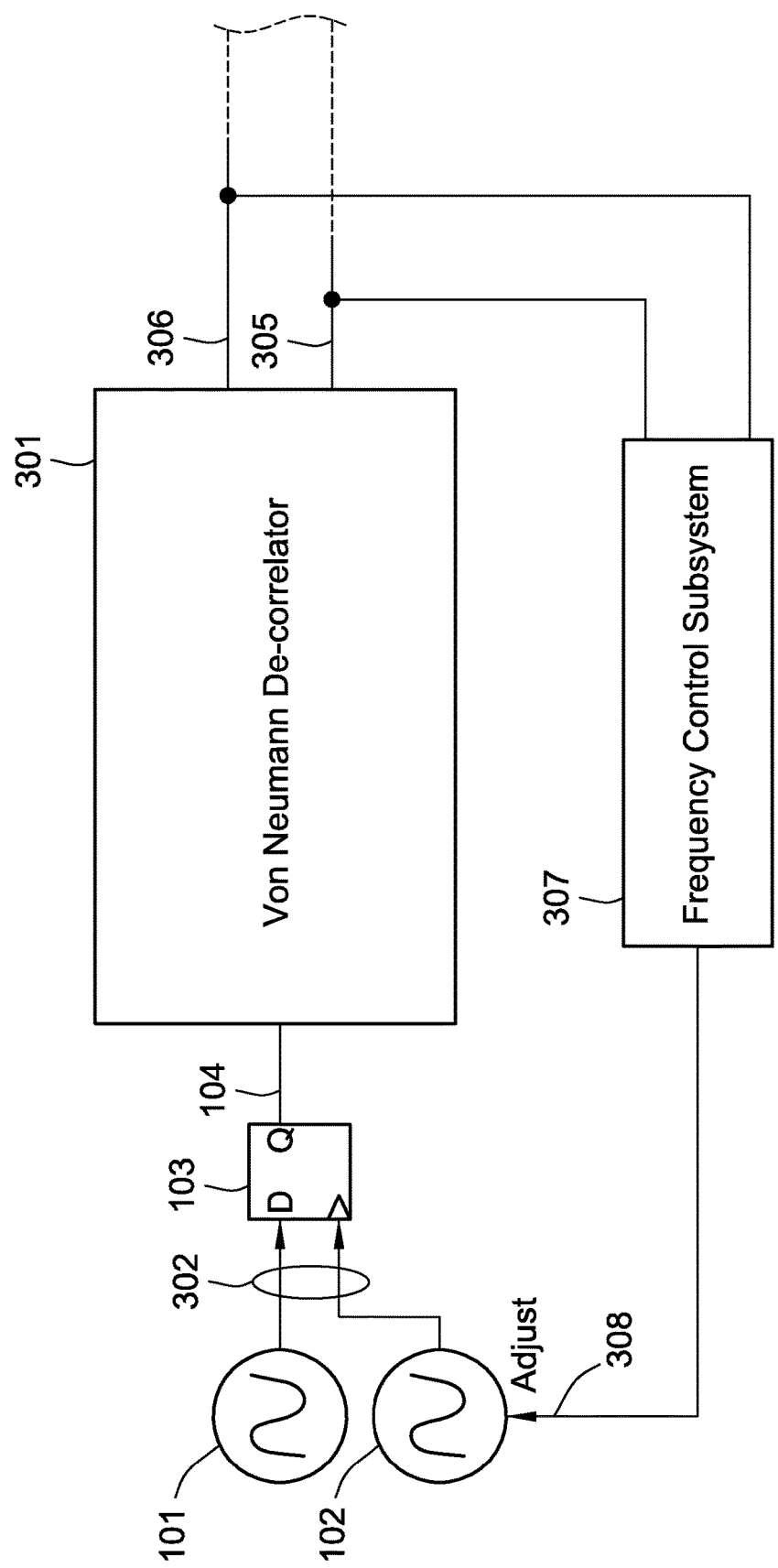
FIG. 3 shows an input sampling subsystems connected to a von Neumann de-correlator to provide unbiased inputs and a control system to adjust the input oscillator matching.

FIG. 3 illustrates a system that includes an input sampling subsystem 302 connected to a von Neumann de-correlator 301 to produce an output bit stream that has reduced bias (greater entropy) on an output line 306. This output of the de-correlator changes states whenever the input signal is in first and second states for equal portions of a selected time period, e.g., the output signal on line 306 changes states in a first direction (e.g., goes high) when x is greater than y, and in a second direction (e.g., goes low) when x is less than y. This output signal is a random sequence of values with reduced bias.

The de-correlator 301 typically considers the bits in the input stream two bits at a time. If the two bits x and y in any given pair are equal (x=y), a second output signal on line 305 is in a first state, and if x and y are not equal, the output signal on line 305 is in a second state. This output signal is indicative of the degree of entropy of the random sequence of values received at the input of the de-correlator, and is used to control adjustments to the frequency of the oscillator 102, as described in detail below.

Figure 4:
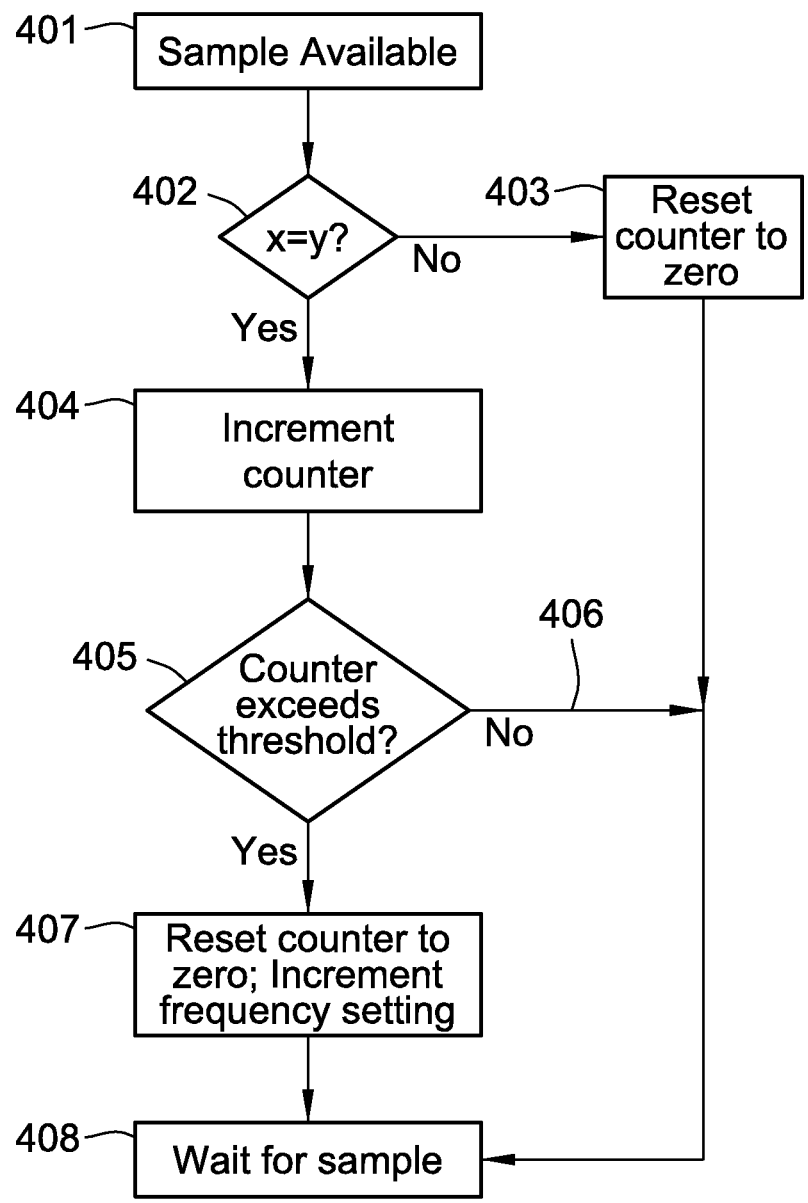
FIG. 4 shows an embodiment comprising numerous von Neumann de-correlators within the random sequence generator for removing bias from the sequence.

To improve the entropy of the de-correlator output on line 306, the output on line 305 is processed by a frequency control subsystem 307 to determine when the frequency of the tunable oscillator 102 should be adjusted. One algorithm for making this determination, in the subsystem 307, is illustrated in FIG. 4. Step 401 of this algorithm receives the signal from output line 306 at step 401, and then step 402 determines whether the state of that signal indicates that x=y. If the answer is negative, step 403 resets a counter to zero, and the system waits for the next sample at step 408. If the answer at step 40 is affirmative, step 404 increments the counter, and then step 405 determines whether the incremented counts exceeds a preselected threshold. If the answer is negative, step 406 takes the system to step 408 to await the next sample. If the answer at step 405 is affirmative, the counter is reset to zero and a signal is produced on line 307 to increase the frequency of the oscillating output of the tunable oscillator 102. This increased frequency increases the entropy of the sequence of random values at the output of the sampling flip flop 303.

The signal on the output line 305 of the von Neumann de-correlator 301 provides a useful measure of when the system is failing to produce entropy at an acceptable rate. In extreme cases, the oscillators' operation may become balanced to within the resolution limits of the frequency control subsystem 303, producing little or no measurable entropy at all. Thus the signal on line 305 is used to determine when an adjustment to the relative oscillator frequencies is needed to improve the rate of entropy generation. In a preferred embodiment shown in FIG. 3, individual oscillator pairs 101/102 are adjusted independently of other pairs that may be present.

If the change results in an improvement in the rate of entropy generation, the new relative frequencies are used indefinitely. If the rate of entropy production again falls below a threshold measured by successive failures to produce samples, another adjustment is made. After the frequency relative frequencies are raised beyond a preset limit, they are reset to a predetermined lower bound. This method allows the relative frequencies of each oscillator pair to vary independently as needed based on the pairs ability to contribute entropy to the system. The strategy is very general: it allows the system to compensate for changes due to changing supply voltage, ambient and operating temperature, drift over time, and other factors that change over the operational lifecycle of the system. It also allows the systems to respond to and recover from attempts to use external parameters of the circuit to manipulate its operation in an attempt to make predictable the random numbers generated by the system, which is a characteristic of certain kinds of attacks on systems that employ cryptographic random number generators.

Figure 5:
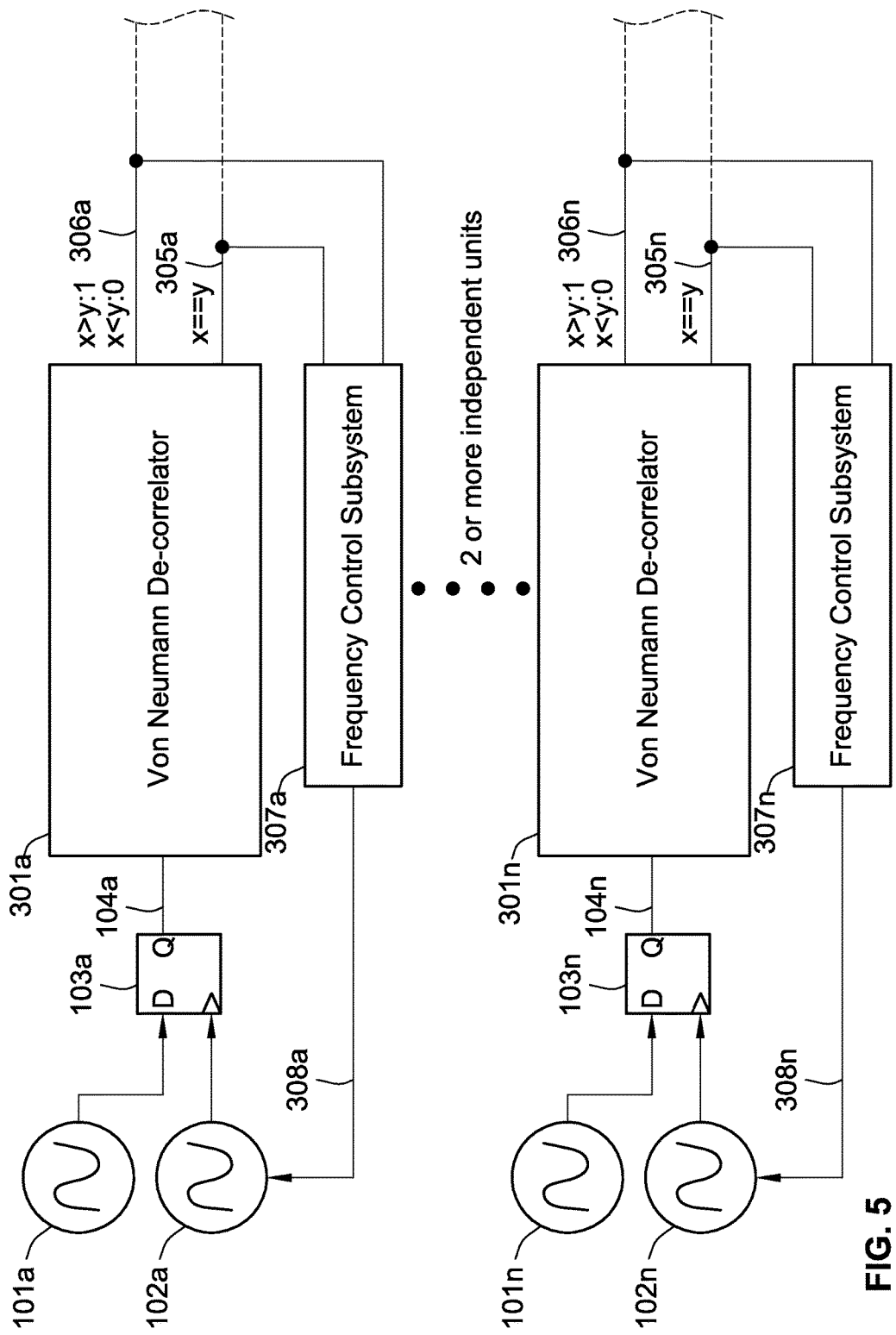
FIG. 5 shows one embodiment of an oscillator pair with frequency matching control.

FIG. 5 illustrates a system in which multiple input bit streams 104a . . . 104n are produced by multiple independent oscillator pairs 101a/102a . . . 101n/102n. These independent streams 104 may be combined to produce a further enhancement of the entropy stream. Other methods exist in the art to produce an output indicative of the degree of entropy of a random sequence of values. For example, the time between bit-generation events may be measured directly, or the actual bit values output from the sampling gates may be measured directly as they are produced. Such methods typically produce entropy at different rates relative to each other, due to the differing statistical characterization of the output bit stream. They also require different detailed designs in order to obtain the samples, as will be apparent to those skilled in the art.

FIG. 5 shows at least two input sampling subsystems connected to von Newman de-correlators, as described in FIG. 3. The input data streams on the lines 104a . . . 104n are supplied to von Neumann de-correlators 301a . . . 301n to produces outputs on lines 306a . . . 306a, and the outputs on the lines 305a . . . 305n are fed to frequency control subsystems 307a . . . 307n to produce feedback control signals to the corresponding tunable oscillators 102a . . . 102n.

While two such circuit blocks are shown, it should be noted that multiple circuit blocks may be used. Here, an aggregated bit stream is monitored to determine characteristics thereof relating to overall performance. For example, entropy of values within the aggregate bit stream is monitored. Alternatively, results of other processes are monitored such as bit rejection statistics. When entropy falls off below known limits, relative frequencies of each pair of input circuits are adjusted. The known limits are optionally preset. Further optionally, the known limits are programmable. The above methodology for tuning is effective independently and when combined with other methods.

Figure 6:
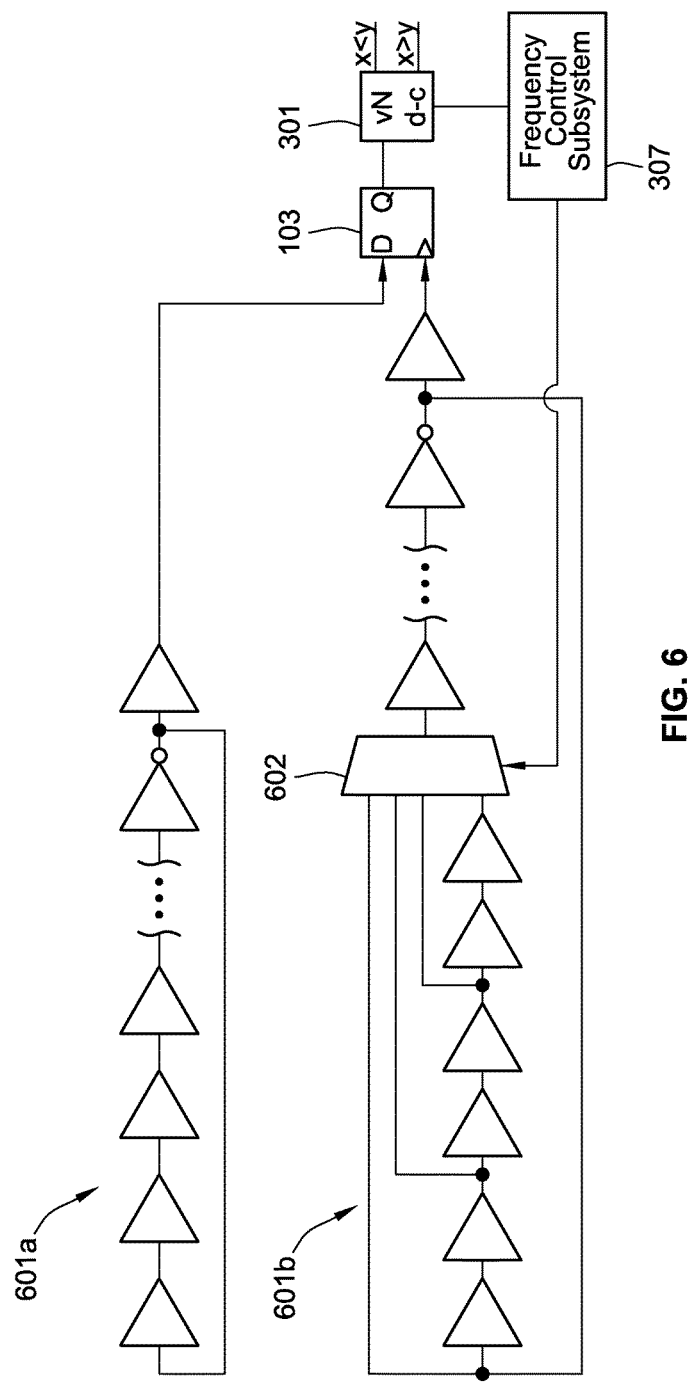
FIG. 6 shows an alternative realization of an oscillator pair with frequency matching control.

FIG. 6 shows a pair of oscillators 601a and 601b with tunable relative frequencies. In one embodiment, a ratio of fundamental frequencies for each pair is selected to be within a range of about 3 to 50. Though free-running oscillators—oscillators starting up in an unknown state—are designed to avoid common harmonics, the present deterministic digital designs intentionally exploit an effect of harmonics to align the sample clock's gate edge with the sampled clock's rising or falling edge through a transition region. Tuning, as shown in FIG. 6 is accomplished, for example, by controlling a length of ring oscillator 601b using a multiplexer 602. Alternatively, another method for tuning oscillator frequency is relied upon. Yet further, the oscillator relative phase can be made tunable.

Since a plurality of pairs of oscillators are present in some embodiments, in those embodiments different oscillator frequencies and harmonics are usable for each pair providing less correlated or uncorrelated entropy. Tuning of each pair of oscillators is performable separately and, as such, the entropy provided by each is somewhat within the control of a control circuit. Differences in tuning also potentially contribute to the overall entropy of the system.

Figure 7:
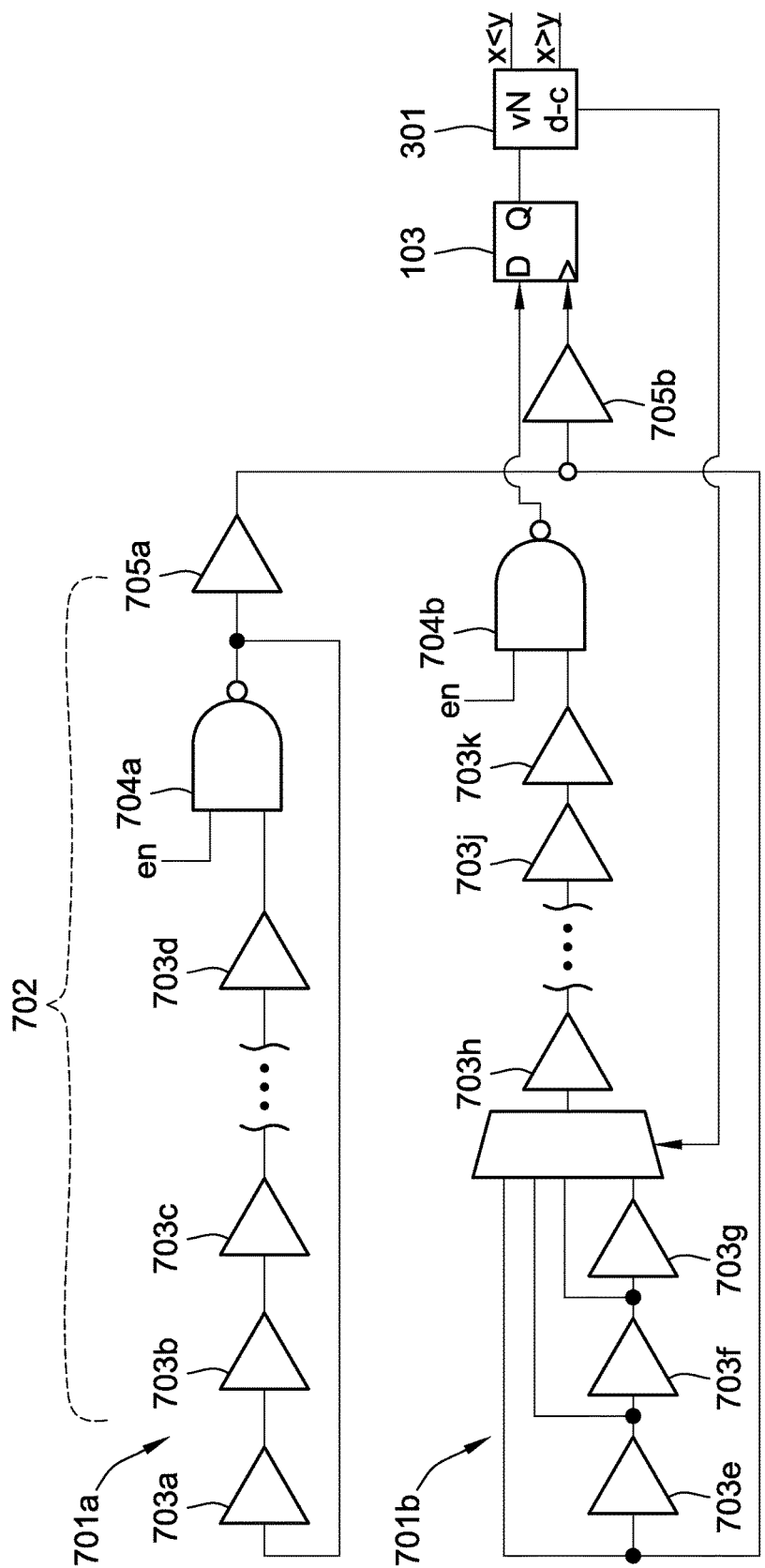
FIG. 7 shows preferred control algorithm for the frequency matching control element.

Typical free-running oscillators formed as ring oscillators consist of an odd number of inverting elements disposed serially in a ring. When such a configuration is used, tuning of frequencies and harmonics involves removing one or more cells in non-inverting groups from the path of the ring oscillator—for example, an even number of inverters would be a non-inverting group. It is sometimes beneficial to combine inverters with non-inverting buffers. Though the non-inverting buffers do not invert the signal and therefore do not result directly in oscillation, they do provide delay and they may be removable from the path of the ring oscillator individually without affecting the oscillating property of the ring. For a gated oscillator design—an exemplary tunable oscillator as described above—advantages exist to using buffers 703a-k for the vast majority of the ring 701a as shown in FIG. 7. FIG. 7 shows an oscillator pair comprising buffers 703a-k, and control gates 704a-b. In this case, the length of the ring 702 need not be an odd number of elements even though the number of inverting elements is odd. Buffers 703a-k are selected for their propagation delay and drive strength characteristics. Control granularity of loop delay is often finer by choosing short delay buffers in the frequency-adjustment portion of the loop (703e-g), allowing incremental delays to be added or removed from the ring In another embodiment, buffers of differing delays are optionally utilized allowing switching of different buffers to achieve even finer granularity of adjustment or aggregating buffers for coarser frequency adjustment. A remainder of the ring optionally includes comparatively slower elements for maintaining the approximate frequency of the ring oscillator.

For example, if a ring comprises seven inverters and a control portion comprising four buffers each with an approximate delay of double a previous buffer in the loop, the resulting loop is tunable with a delay of 1u by enabling disabling the first buffer, 2u by enabling disabling the second buffer, 3u by enabling/disabling the first buffer and the second buffer, . . . 15u by enabling disabling all the buffers. Alternatively, the buffers have delays of 1u, 1.1u, 1.2u, etc. to provide very fine adjustment depending on the buffer selected. Because two inverters need not be removed from the ring for each adjustment, much finer adjustments are sometimes supportable as are more varied types of adjustments.

The current disclosure is that of a set of oscillators connected pairwise to digitizing subsystems. The oscillators' operation is designed to be enabled or disabled by a gating signal. When enabled, each oscillator operates on its fundamental frequency. Oscillator pairs and the digitizing subsystem are designed to maximize the probability of sampling the input signal while it is in its transition region of operation, and therefore its value is neither logic "1" nor "0". Operation of the circuit may change over time due to variations in parameters such as ambient temperature, presence or absence of power supply noise, changes in operating voltage, and other factors. Accordingly a control circuit monitors operation of the system and adjusts the length of an oscillator chain, and hence its frequency, if it is not producing sufficiently frequent random results.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the present invention, which is set forth in the claims that follow.

The invention claimed is:

1. A random number generator comprising
a first circuit producing a first and second random sequence of values, said circuit having a first and second adjustable input that changes the entropy of the first and second random sequence of numbers, respectively, the first circuit comprising:
   a first and second oscillator producing first and second oscillating output signals, at least the second oscillator being tunable so that the frequency of said second oscillating output signal can be adjusted by signals applied to the first adjustable input, and
   a first sampling circuit receiving said first and second oscillating output signals and sampling said first oscillating output signal at intervals determined by said second oscillating output signal;
   a third and fourth oscillator producing third and fourth oscillating output signals, at least the fourth oscillator being tunable so that the frequency of said fourth oscillating output signal can be adjusted by signals applied to the second adjustable input, and
   a second sampling circuit receiving said third and fourth oscillating output signals and sampling said third oscillating output signal at intervals determined by said fourth oscillating output signal:
the random number generator further comprising a first von Neumann de-correlator circuit receiving the first random sequence of values from the first circuit and producing a first output signal indicative of the degree of entropy of the first random sequence of values and a second output signal that changes states whenever the first random sequence of values from said first circuit is in first and second states for equal portions of a selected time period,
a second circuit that adjusts the first adjustable input of the first circuit in response to the outputs of the first von Neumann de-correlator circuit, and
a second von Neumann de-correlator circuit receiving the second random sequence of values from the first circuit and producing a first output signal indicative of the degree of entropy of the second random sequence of values and a second output signal that changes states whenever the second random sequence of values from said first circuit is in first and second states for equal portions of a selected time period, and a third circuit that adjusts the second adjustable input of the first circuit in response to the outputs of the second von Neumann de-correlator circuit.

2. The random number generator of claim 1 in which said first, second, third and fourth oscillators are free-running from the first application of power, so that said first, second, third and fourth oscillating output signals have random phases with respect to each other.

3. The random number generator of claim 1 in which said first and second sampling circuit is a D-type flip flop having a D input receiving said first and third oscillating output signal, and a clock input receiving said second and fourth oscillating output signal.

4. The random number generator of claim 1 in which said second circuit includes a counter that counts the state changes in said first output signal of said de-correlator, and is reset each time the count reaches a predetermined threshold value.

5. The random number generator of claim 4 in which said second circuit adjusts the first adjustable input of said first circuit each time said count reaches said predetermined threshold value.

6. The circuit of claim 1 which includes a power saving control circuit for controlling operation of at least the first oscillator and the second tunable oscillator to switchably control their operation between a first normal mode of operation and a second low power mode of operation.

7. The circuit of claim 1 which includes a power saving control circuit for controlling operation of at least the first oscillator and the second tunable oscillator to switchably control their operation between a first low power mode of operation in which at least the first oscillator and the second tunable oscillator other than oscillate and a second normal mode of operation.

* * * * *